United States Patent
Narovlyansky et al.

(10) Patent No.: US 8,636,850 B2
(45) Date of Patent: Jan. 28, 2014

(54) METHOD OF REMOVING SUPPORT STRUCTURE FROM 3-D OBJECTS MADE BY SOLID FREEFORM FABRICATION

(75) Inventors: Vladimir Narovlyansky, Ma'alot (IL); Avi Cohen, Rishon Lezion (IL); Beverley Soffer, Rishon LeZion (IL)

(73) Assignee: Stratasys Ltd., Rehovot (IL)

( * ) Notice: Subject to any disclaimer, the term of this patent is extended or adjusted under 35 U.S.C. 154(b) by 0 days.

(21) Appl. No.: 12/601,327

(22) PCT Filed: May 22, 2008

(86) PCT No.: PCT/IL2008/000694
§ 371 (c)(1),
(2), (4) Date: Nov. 23, 2009

(87) PCT Pub. No.: WO2008/142691
PCT Pub. Date: Nov. 27, 2008

(65) Prior Publication Data
US 2010/0170540 A1    Jul. 8, 2010

Related U.S. Application Data

(60) Provisional application No. 60/924,652, filed on May 24, 2007.

(51) Int. Cl.
*B08B 3/06* (2006.01)
*B08B 11/00* (2006.01)

(52) U.S. Cl.
USPC ............... 134/34; 134/42; 264/233; 264/344

(58) Field of Classification Search
None
See application file for complete search history.

(56) References Cited

U.S. PATENT DOCUMENTS

| | | | | |
|---|---|---|---|---|
| 4,747,544 A * | 5/1988 | Kranzle | | 239/251 |
| 4,761,039 A | 8/1988 | Hilaris | | |
| 5,518,680 A * | 5/1996 | Cima et al. | | 264/401 |
| 5,593,339 A * | 1/1997 | Yam et al. | | 451/36 |
| 6,916,441 B2 * | 7/2005 | Newell et al. | | 264/442 |
| 2005/0033478 A1 * | 2/2005 | Hunter et al. | | 700/273 |

* cited by examiner

*Primary Examiner* — Joseph L Perrin
*Assistant Examiner* — Caitlin N Dunlap
(74) *Attorney, Agent, or Firm* — Pearl Cohen Zedek Latzer Baratz LLP

(57) ABSTRACT

Some demonstrative embodiments of the invention include an apparatus and a method for removing the support structures from three-dimensional objects, in which the support removal is carried out using techniques that decrease the duration of the support removal process and increase the quality of the final three-dimensional objects. This method also ensures the safe removal of the support structures without damage to the three-dimensional object.

6 Claims, 3 Drawing Sheets

US 8,636,850 B2

METHOD OF REMOVING SUPPORT STRUCTURE FROM 3-D OBJECTS MADE BY SOLID FREEFORM FABRICATION

CROSS-REFERENCE TO RELATED APPLICATIONS

This application is a National Phase Application of PCT International Application No. PCT/IL2008/000694, International Filing Date May 22, 2008, claiming priority of U.S. Provisional Patent Application, 60/924,652, filed May 24, 2007 both incorporated herein in their entirety.

BACKGROUND

Solid freeform fabrication (SFF) is a process for the fabrication of three-dimensional (3-D) objects or prototypes, for example by printing or constructing parts of such objects or prototypes in layers. 3-D printing, a specific SFF technique, works by building up parts, layer by layer, to create a 3-D object. 3-D printing involves depositing building materials for fabricating the object, sometimes referred to as modeling materials, and building materials for constructing various structures supporting the object during its fabrication that may include support materials and optionally also modeling materials. On completion of the fabrication process, the support structures are removed, leaving a finished 3-D object.

Hand removal of the support structure may be a cumbersome, lengthy and inaccurate process. Remnants of support material may cling to the 3-D object even after the removal process. This may decrease the quality of the final product and therefore may require further processing. There may also be concerns regarding the removal of support material from small-sized objects. Due to the size of these objects, it may be difficult to remove all of the support material as portions of the 3D object may be virtually inaccessible.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
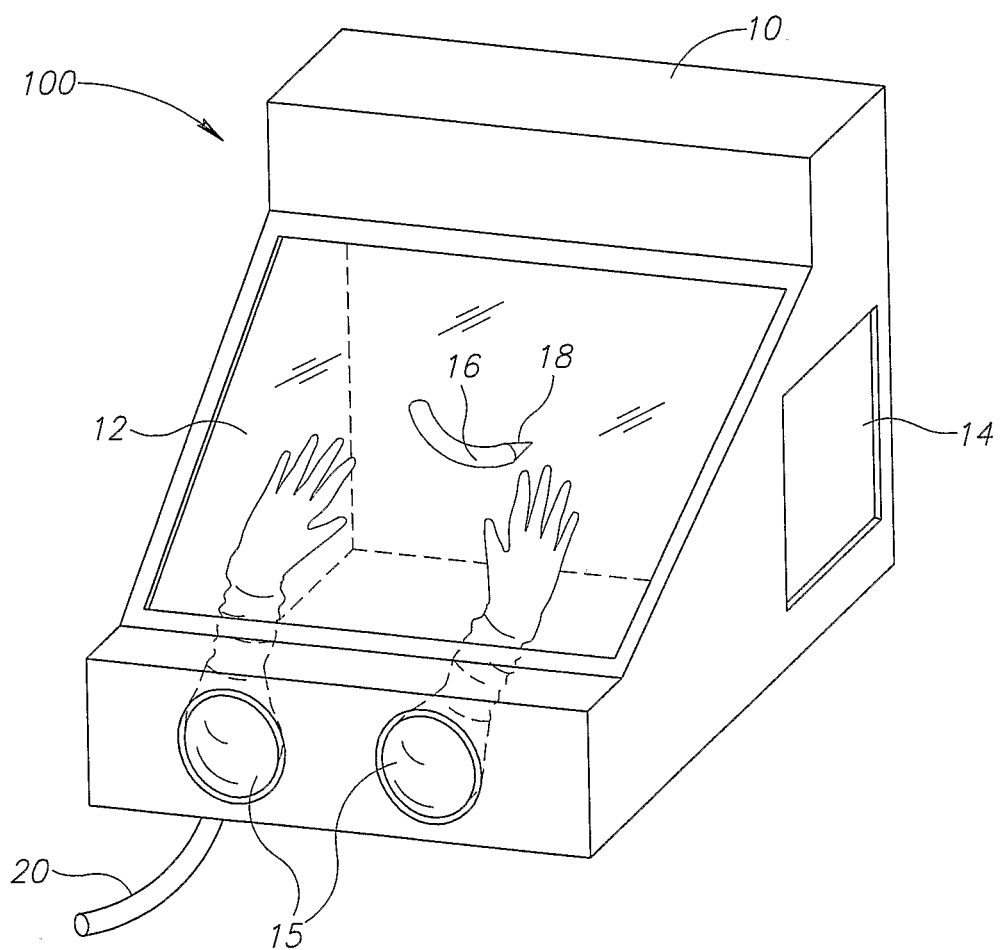
FIG. 1 is a schematic representation of a cleaning station usable for removing support material from 3-D objects produced by solid freeform fabrication according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF DEMONSTRATIVE EMBODIMENTS OF THE PRESENT INVENTION

In the following detailed description, numerous specific details are set forth in order to provide a thorough understanding of the invention. However it will be understood by those of ordinary skill in the art that the embodiments of present invention may be practiced without these specific details. In other instances, well-known methods, procedures and components have not been described in detail so as not to obscure the present invention.

Embodiments of the invention are directed to removal of support material or support structures from an object produced by solid freeform fabrication techniques using a jet of fluid. According to some embodiments, a vortex nozzle having a vortex generator may be used to create a rotating jet having a hollow conical shape, i.e. the jet rotates in such a manner that it forms a hollow conical shape. Some embodiments are directed to removal of support from relatively small-sized objects produced by solid freeform fabrication techniques by jetting a fluid or "jet agent" into a perforated container containing the objects. The jet agent may be a water or water-based solution. It should be understood however that the embodiments of the invention are not limited in this respect and the jet agent may be for example alcohol.

The terms "support", "support material" and "support structure" as used throughout the specification and claims should be construed in their broadest interpretation to include any material or materials used for provisional support during solid freeform fabrication of a three-dimensional object and that is not part of the three-dimensional object. The support may include materials that are different than the modeling materials used to fabricate the three-dimensional object or a combination of modeling materials and materials that are different than the modeling materials used to fabricate the three-dimensional object.

Some embodiments of the invention are directed to removal of support that includes water miscible or soluble components, capable of dissolving or swelling upon exposure to specific liquids, such as water, an alkaline or acidic aqueous solution or to an aqueous detergent solution. The water miscible components may include (meth)acrylated urethane oligomer derivative of polyethylene glycol, a partially (meth) acrylated polyol oligomer, a (meth)acrylated oligomer having hydrophilic substituents, polyethylene glycol mono or di(meth)acrylated, acrylamide, Acryloylmorpholine (ACMO) or any combination thereof. In another embodiment, the hydrophilic substituents are acidic substituents, amino substituents, hydroxy substituents, ionic substituents or any combination thereof. An example of an acrylated monomer with hydrophilic substituents is betha-carboxyethyl acrylate, which contains acidic substituents.

Although the explanation below does not limit embodiments of the invention, it is assumed that upon contacting the jet agent, the water-miscible component is dissolved and removed from the support material. The preliminary removal of the soluble or dissolved component may substantially reduce the level of adhesion of the support material to the object's surface thus enabling and/or facilitating complete removal of the support material.

For example, when a support structure that comprises a skeleton structure including thin columns of modeling material embedded in a continuum of a softer support material is exposed to water, the soluble components of the softer material may be extracted from the support and dissolved or at least partially dissolved in the water. When this is done, the support, now comprising the skeleton structure of modeling material and the non soluble fraction of the softer material, becomes fragile or loose, so that minute force can easily break it down. In addition, water soluble components may swell when in contact with the jet agent. Swelling may cause deformation in the support, which itself may facilitate the breaking and loosening of the rigid components. Additional mechanical force brought about by the jet of water may accelerate the process of dissolving and swelling, and the breaking of the rigid components.

Other embodiments of the invention are directed to removal of non-water miscible support or support containing non-water-miscible or soluble components, where the jet agent may comprise, for example, a detergent solution or alcohol.

Reference is now made to FIG. 1, which illustrates an exemplary cleaning station for removing support material from 3-D objects produced by solid freeform fabrication according to embodiments of the invention. The cleaning station may be a glove box that may be used as a sealed space to enable the jetting operation. Glove box 100 may include a housing 10 with a transparent window 12, an opening 14 and two glove holes 15 sealed with large rubber or plastic gloves, for example, incubator gloves, extending into the housing, for the user's hands. Glove box 100 may further include a high-pressure liquid hose 16 with a jet nozzle 18 and a liquid outlet 20. Optionally, glove box 100 may include a window wiper mechanism (not shown) to enable the user to detect the 3-D object during the jetting process. Water hose 16 may be connected to a water pump (not shown) that may deliver liquid into the glove box at a controlled liquid pressure.

An operator may insert a three dimensional object produced by solid freeform fabrication to the glove box through opening 14 that may be for example, a sliding window. Then, the operator may insert his hands into the glove holes holding the object in one hand and the water hose in the other hand and perform the cleaning operation by directing the liquid jet at the surfaces of the object and rotating the object as and when necessary, such that the liquid jet comes in contact with the entire surface of the object.

According to some embodiments, there may be more than one replaceable water hose. For example, there may be one relatively thick high-pressure water hose having, for example, a diameter of around 15 mm for regular use in cleaning larger objects and the outer object surfaces of any 3-D object, and another thin water hose having, for example, a diameter of around 4 mm for use on inner object surfaces, when for example such inner surfaces are not easily accessible by the thick water hose and nozzle. For example, the thin water hose may be introduced into an object via an aperture in the object.

According to embodiments of the invention, the pressure of the jet agent may vary for example, from 5 to 150 atmospheres, depending on various parameters of the support structure like the degree of plasticity, the support's penetrability to the jet agent, breakability, degree of swelling, and the quantity of components in the support material which may be soluble in the liquid agent. For each support structure, the desired pressure may be chosen experimentally. The pressure has to be sufficiently great, in order to ensure significant deformation of the support and, therefore, to increase the surface area of its interaction with water or jet agent, leading to its increased dissolution in the water or jet agent. Hence, the pressurized jet, while interacting with the support material, may not only forcefully remove parts of support material from the object, but may also accelerate reduction of adhesion of the support material to the object's surface beforehand and during the course of jetting. Still, the pressure should be adjusted to the object and not be too great, so as to prevent any damage to the object itself.

It may be difficult to find a pressure for the liquid jet that would remove the support material without damaging the three-dimensional object, in particular delicate surfaces and features of the object. The jet may hit relatively small areas at the surface of the object at a relatively high energy that may be high enough to break the object. A standard jet nozzle is usually designed to create narrow-pointed or flat-shaped jets that may retain their shape and energy even for a relatively long distance. For example, a jet exiting a standard nozzle having an outlet of diameter 0.5 mm at a pressure of 80 Bar would sustain approximately 90% of its energy when hitting a surface at a distance of 10 mm from the nozzle.

Accordingly, changing the inlet pressure and/or the distance between the outlet and the surface may not be sufficient to prevent damage to the object. Further, standard nozzles may not be suitable for cleaning inner surfaces and cavities having narrow openings.

According to embodiments of the invention, the nozzle may be a vortex generator nozzle, designed for removal of support material from delicate 3-D objects while ensuring that the object remain intact. According to embodiments of the invention, nozzle 18 may enable creating a jet of fluid having the shape of a hollow conical beam with a central axis of symmetry in the direction of the outlet of the nozzle. The liquid may exit nozzle 18 as a hollow conical vortex having relatively thin walls. Usage of the vortex generator nozzle may enable controlling the interaction energy with the object by changing the distance between the nozzle and the surface without adjusting the inlet pressure of the liquid.

Figure 2:
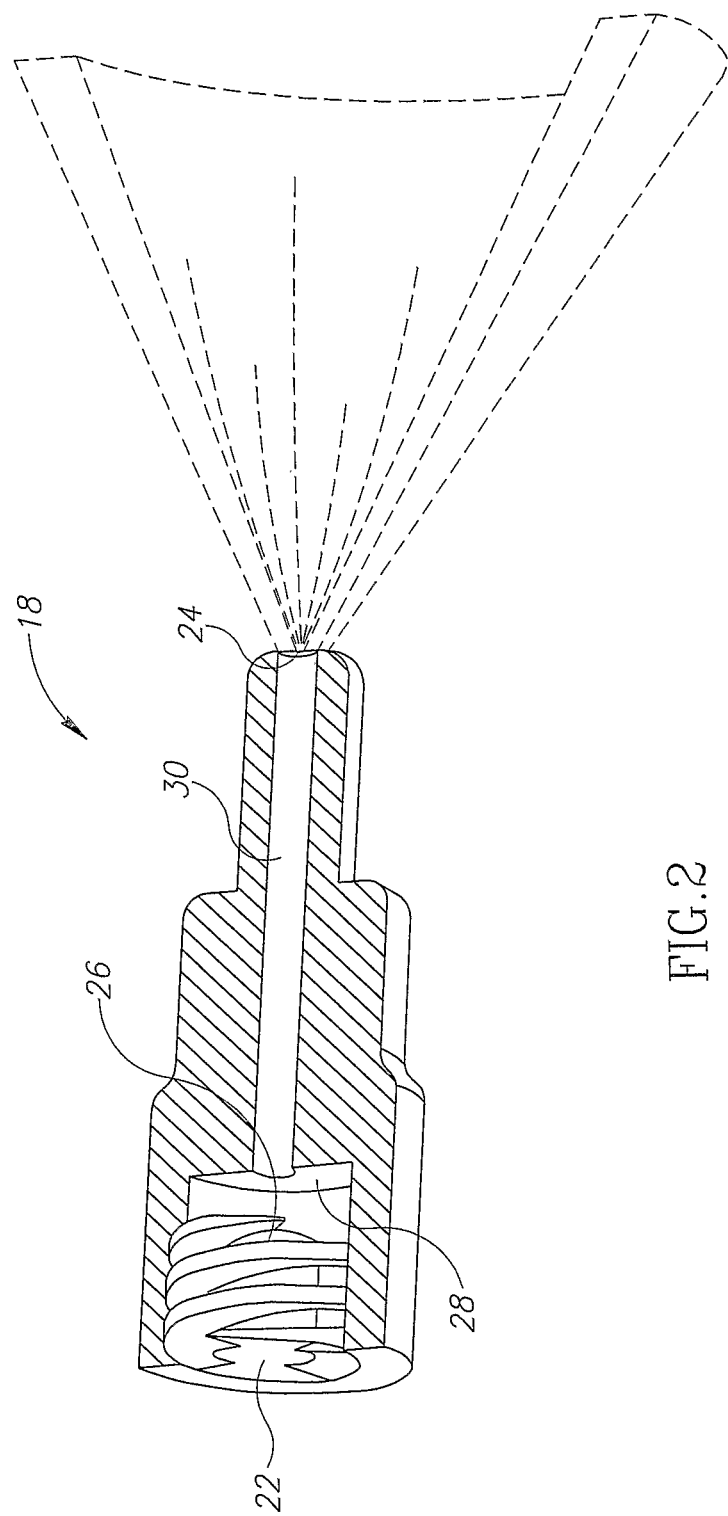
FIG. 2 is a schematic representation of a vortex nozzle according to embodiments of the invention.

Reference is now made to FIG. 2, which illustrates an exemplary jet nozzle that is capable of creating a rotating vortex-like jet within the glove box according to embodiments of the invention. It should be understood to a person skilled in the art that embodiments of the invention are not limited to the structure of the vortex nozzle described below and other nozzles capable of creating a rotating jet are likewise applicable. The term "rotating jet" refers to a stream of high-pressure liquid that exits a nozzle at a certain angle relative to the longitudinal axis of the nozzle and rotates around this axis. Such a rotating jet may appear to the naked eye as having a hollow conical shape with relatively thin walls. When such a rotating jet is directed at a particular point on a surface, it may hit the surface by following a circular path around that point. Accordingly, the jet may hit each point on the circle for a relatively short period of time at a high enough energy enabling removal of the support material without damaging the surface. Further, the rotating jet may cover at a given time a larger area than a regular jet formed by a conventional nozzle.

A nozzle, such as nozzle 18 may include an inlet 22 coupled, for example, to liquid hose 16 for receiving the jet of fluid and an outlet 24 through which a rotating jet of fluid having a hollow conical shape may exit. Nozzle 18 may further include an n-thread worm pipe 26, for example, 2-thread worm pipe to carry and direct the liquid, an inner chamber 28 having a cylindrical shape connected to the exit of worm pipe 26 and a pipe 30 extending from chamber 28 to outlet 24. It should be understood to a person skilled in the art that more than two thread pipes, for example 3-thread or 4-thread worm pipes may be used.

According to embodiments of the invention, inlet 22, pipe 30 and outlet 24 are coaxial forming a symmetrical nozzle having an axis of symmetry around a theoretical line connecting the inlet and outlet. As known in the art, standard vortex generators are asymmetrical where the liquid enters the nozzle at one direction and exits at another direction, for example perpendicular to the entrance direction.

In operation, the jet agent may exit worm pipe 26 and enter chamber 28 at a particular velocity. The velocity of the liquid may include an axial component and a tangent component relative to the cylindrical surface of chamber 28, which may lead to a powerful rotation of the liquid jet inside chamber 28 and creation of a thin-walled conical vortex when the jet exits the nozzle through outlet 24. The energy at which the liquid jet reaches the surface of the 3-D object may be adjusted by changing the distance between the nozzles outlet 24 and the object surface (not shown). According to some embodiments, prior to performing the cleaning operation, the desired distance may be determined based on jet pressure, the jet agent and physical and chemical characteristics of the three-dimensional object and the support material.

Further, due to the presence of a tangential speed component of the conical jet, the jet agent may enter inner surfaces and cavities with sufficient energy to ensure cleaning of areas that are unreachable and/or not treated with a standard nozzle.

Figure 3:
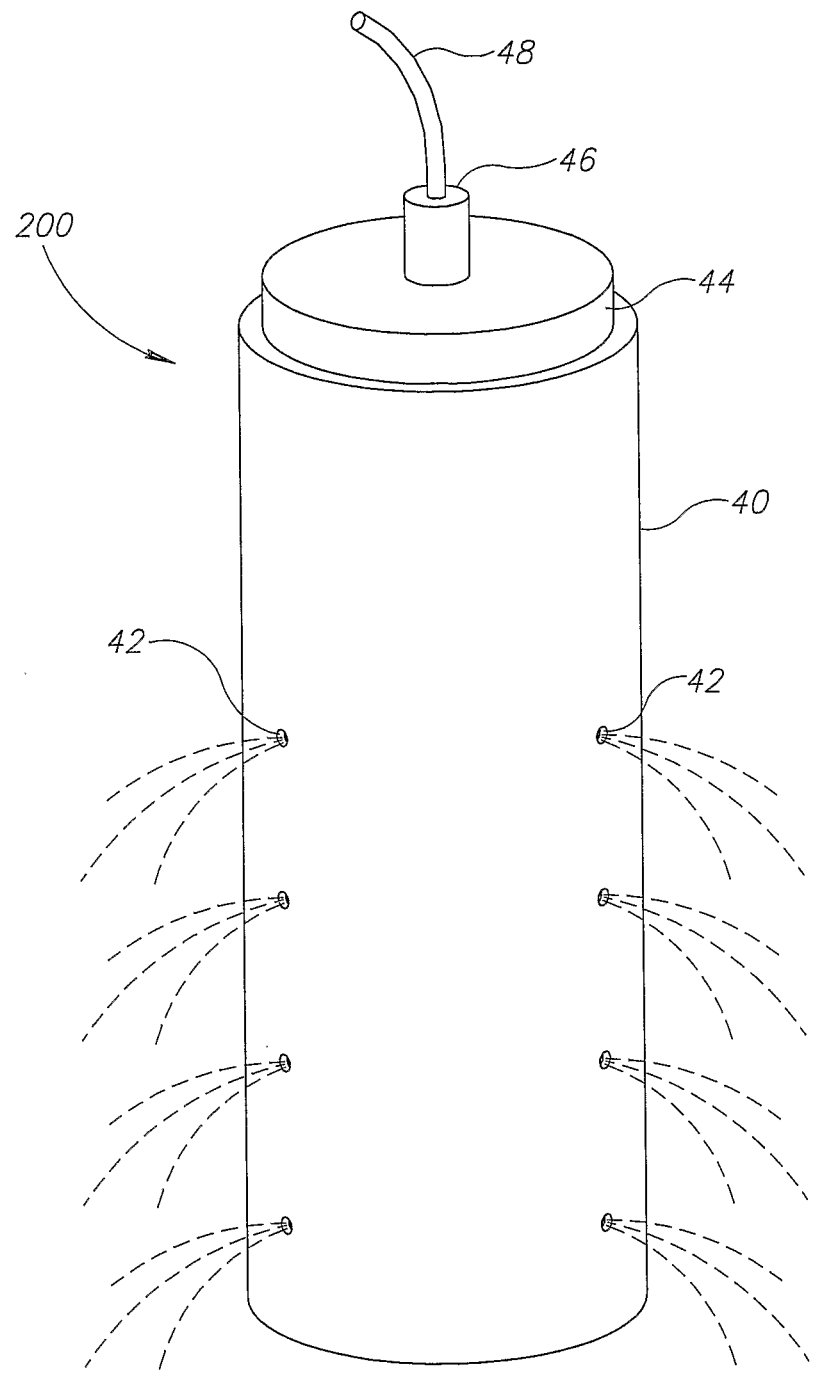
FIG. 3 is a schematic representation of a cleaning apparatus usable for removal of support material from 3-D objects produced by solid freeform fabrication according to embodiments of the invention.

Reference is now made to FIG. 3, which illustrates a cleaning apparatus usable for removing support material from relatively small-sized 3-D objects produced by solid freeform fabrication according to a demonstrative embodiment of the invention. The small-sized 3-D objects may have dimensions in the range of for example between 10 and 50 mm. According to some embodiments, a cleaning apparatus 200 may include a cleaning cell or container 40 of a substantially cylindrical shape having draining perforations 42 on its circumferential surface. It should, however, be understood to a person skilled in the art, that the container 40 may be of any other suitable shape, for example a spherical shape.

Cleaning apparatus 200 may further include a lid 44 having an inlet 46 suitable to be connected to a high pressure liquid hose 48. Cleaning apparatus 200 may be part of the cleaning station of FIG. 1 and may be used in conjunction with glove box 100, in which case liquid hose 16 may be connected to inlet 46 or as a stand-alone cleaning apparatus connected directly to a water supply capable of producing a high-pressure liquid jet. According to embodiments of the invention the cleaning apparatus may be used for a method of removing support material from relatively small-sized 3-D objects produced by solid freeform fabrication.

The method may include inserting one or more three-dimensional objects to container 40 and connecting, using high-pressure liquid hose 48 or 16, the inlet of the lid to a high-pressure liquid source (not shown) and then applying a liquid jet at a desired pressure for a period of time, for example 30 minutes. The liquid jet may be a regular high-pressure jet exiting from any suitable nozzle or a rotating jet exiting from a vortex nozzle. The collisions within the container 40 of the object with other object(s) assist in releasing the support material from the three-dimensional object(s), and also in removing the support from the object. The repeated collisions may weaken adhesion and remove or facilitate removal of the support material from around the small object/s. According to embodiments of the invention, the liquid jet is inserted to the container from above the water level causing the objects within the container to move randomly and rapidly, and to rotate, colliding with either the internal walls of the container and/or against one another. In order to increase the amount of turbulence in container 40 and cause the 3-D objects to be at least partially out of the liquid, at least part of the time, the jet may be directed to the contact surface of the air and the water. Accordingly, occasionally the jet may directly hit the 3-D objects thus speeding up the removal process.

According to embodiments of the invention, container 40 may be designed such that during the cleaning operation, the water level of the container is maintained within a desired range. In order to accomplish this, the number of perforations 42, the distribution of the perforations and the total cross sectional area of the perforations 42 may be determined so that the water level is maintained within that range. Further, the inlet pressure of the liquid jet entering container 40 may be adjusted to maintain the desired water level. In some embodiments, liquid is filled until approximately half-way point of the container 40. It is important that the water not be filled to the top of the container 12. If the water level were to be towards the top end of the container 40, there may not be enough force from the water jet to cause support material to break away from the 3-D objects. On the contrary, if there was too little or no water in container, then the 3-D objects may not be able to float and properly collide with each other or with the walls.

In another demonstrative embodiment of the present invention, small articles such as spheres or differently shaped articles, which are smaller than the 3-D objects but larger than the draining perforations 42, and are comprised for example, of sand, plastic, rubber, teflon or other materials, may be introduced into container 40 together with the small 3-D objects, increasing the force applied to the object surfaces, and aiding in and facilitating loosening and removal of support from the objects. The small articles should not be of too hard a material, so as not to cause damage to very thin or delicate parts of the objects.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for removing support material from objects made by solid freeform fabrication, the method comprising:
    inserting two or more objects made by solid freeform fabrication into a cell having an inlet to receive a high-pressure liquid jet located at a top side of the cell and a plurality of draining perforations at the circumferential wall of the cell;
    streaming a liquid jet into the cell through the inlet from above liquid level while a portion of liquid contained in the cell being removed through the draining perforations; and
    adjusting the pressure of the liquid jet to maintain a desired liquid level above at least a portion of the draining perforations such that the cell is kept partially filled with liquid,
wherein the liquid jet is directed onto the surface of the liquid to enable direct contact between the liquid jet and two or more objects, random movement of the two or more objects and collisions with the circumferential wall and with one another to remove support material from the two or more objects.

2. The method of claim 1, wherein the support material comprises components that are soluble or miscible in said liquid.

3. The method of claim 1, wherein said two or more objects are free to float in the liquid, and are randomly moved and rotated by said liquid jet.

4. The method of claim 1, wherein the two or more objects have dimensions of less than 50 millimeters.

5. The method of claim 1 comprising:
    inserting one or more small articles, smaller than the two or more objects made by solid freeform fabrication, into the cell.

6. The method of claim 1, wherein the turbulence in the cell causes the two or more objects to be at least partially out of the liquid, at least part of the time.

* * * * *